UNITED STATES PATENT OFFICE.

DAVID AHL, OF NEWVILLE, PENNSYLVANIA.

IMPROVED METHOD OF PREVENTING OIL-BARRELS FROM LEAKING.

Specification forming part of Letters Patent No. 45,902, dated January 17, 1865.

*To all whom it may concern:*

Be it known that I, DAVID AHL, M. D., of Newville, Cumberland county, State of Pennsylvania, have invented a new and useful Improvement for Coating the Inside of Barrels or other Vessels; and I do hereby declare that the following is an exact description thereof.

The nature of my invention consists in the composition of gum-shellac or other waterproof gums with gas-tar or asphaltum or other equivalent tarry or asphaltic substances, with pearlash or borate of soda or any other alkali as solvents, for the purpose of saturating or coating barrels or other vessels to prevent their leakage.

To enable others skilled in the art to make and use my invention, I will proceed to describe the mode of mixing the ingredients, as follows:

I mix the ingredients to form my composition in the following quantities and proportions: I use of gas-tar seventy pounds, and of gum-shellac thirty pounds, and as a solvent fifteen pounds of borate of soda or four pounds of pearlash, or any alkali of the requisite proportions.

I wish it to be understood that I do not confine myself to the proportions above mentioned, as they may be varied at pleasure.

I put the ingredients in a kettle and cover them with a sufficient quantity of water, and made to boil. The ingredients are to be well mixed until they are perfectly dissolved. In this composition I first immerse the staves or other parts or materials that form barrels or vessels, for the purpose of perfectly saturating and filling up the pores of the wood. The wood, being heated by the composition, is dried, so as to expel its sap and render the wood not liable to shrinkage and perfectly impervious to fluids, water, spirits, or oil; or, when the barrel or other vessel has been prepared or finished, I saturate it in my composition, the composition entering bung-hole and completely lining and coating the inside of the vessel. I use the composition either hot or cold, and I either saturate the staves and inside of the vessels or coat them with the composition by means of a brush; but I prefer using the composition hot, as the surface will dry quicker.

This composition is especially well adapted to prevent the leakage of coil-oil or petroleum barrels; but I also intend to use it for coating all other vessels.

After the barrels are saturated or coated with the composition and dried I steep them in diluted acids for the purpose of neutralizing the effects of the alkalies and fixing the composition.

What I claim as my invention, and desire to secure by Letters Patent, is—

The composition, as herein specified, for the purposes herein substantially set forth.

DAVID AHL.

Witnesses:
    A. C. KLINK,
    H. W. THROCKMORTON.